(12) United States Patent
Klave et al.

(10) Patent No.: US 7,590,979 B2
(45) Date of Patent: Sep. 15, 2009

(54) SYSTEMS AND METHODS FOR REDUCING MEMORY USAGE IN AN EMBEDDED SYSTEM BY LOADING INDIVIDUAL SOFTWARE COMPONENTS

(75) Inventors: Daniel L. Klave, Camas, WA (US); Roy K. Chrisop, Camas, WA (US); Lena Sojian, Fountain Valley, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 558 days.

(21) Appl. No.: 10/047,769

(22) Filed: Jan. 15, 2002

(65) Prior Publication Data
US 2003/0135728 A1 Jul. 17, 2003

(51) Int. Cl.
G06F 9/44 (2006.01)
G06F 3/12 (2006.01)
G06K 15/00 (2006.01)

(52) U.S. Cl. ............... 717/163; 717/121; 717/166; 358/1.15; 358/1.16

(58) Field of Classification Search .......... 717/166–178
See application file for complete search history.

(56) References Cited

U.S. PATENT DOCUMENTS

| | | | |
|---|---|---|---|
| 5,826,090 A | 10/1998 | Mealey et al. | 395/712 |
| 5,860,001 A * | 1/1999 | Cromer et al. | 713/1 |
| 5,919,264 A * | 7/1999 | Reneris | 713/324 |
| 5,970,252 A * | 10/1999 | Buxton et al. | 717/166 |
| 6,154,878 A | 11/2000 | Saboff | 717/11 |
| 6,195,107 B1 | 2/2001 | Iverson | 345/516 |
| 6,212,632 B1 | 4/2001 | Surine et al. | 713/2 |
| 6,226,665 B1 * | 5/2001 | Deo et al. | 718/106 |
| 6,397,317 B1 | 5/2002 | Kusutaki | |
| 6,446,203 B1 * | 9/2002 | Aguilar et al. | 713/2 |
| 6,546,484 B2 * | 4/2003 | Hirai | 713/2 |
| 6,718,463 B1 * | 4/2004 | Malik | 713/2 |
| 6,721,883 B1 * | 4/2004 | Khatri et al. | 713/2 |
| 6,950,953 B2 * | 9/2005 | Kizawa et al. | 713/324 |
| 7,148,980 B2 * | 12/2006 | Tominaga | 358/1.15 |
| 7,212,306 B2 * | 5/2007 | Chrisop et al. | 358/1.16 |
| 2002/0012541 A1 * | 1/2002 | Takemoto et al. | 399/12 |
| 2002/0194008 A1 * | 12/2002 | Yang et al. | 705/1 |
| 2003/0023661 A1 * | 1/2003 | Clohessy et al. | 709/104 |
| 2003/0078963 A1 * | 4/2003 | Parry | 709/203 |

FOREIGN PATENT DOCUMENTS

JP 2000-082010 3/2000

* cited by examiner

*Primary Examiner*—Tuan Q Dam
*Assistant Examiner*—Thuy Dao
(74) *Attorney, Agent, or Firm*—Austin Rapp & Hardman

(57) ABSTRACT

An embedded system configured to reduce volatile memory usage by loading individual software components includes a processor, volatile memory in electronic communication with the processor and non-volatile memory in electronic communication with the processor. The non-volatile memory includes an operating system, a loader application, a loading table and multiple individual software components. The non-volatile memory also includes loading instructions that load and start the operating system. The loading instructions also load and start the loader application. The loading table is then examined to determine which of the individual software components are to be loaded into the volatile memory. Next, each of the individual software components that are to be loaded as indicated in the loading table are loaded into the volatile memory.

26 Claims, 4 Drawing Sheets

SYSTEMS AND METHODS FOR REDUCING MEMORY USAGE IN AN EMBEDDED SYSTEM BY LOADING INDIVIDUAL SOFTWARE COMPONENTS

TECHNICAL FIELD

This invention relates generally to embedded systems, and is more particularly directed toward systems and methods for reducing memory usage in an embedded system.

BACKGROUND

Computer technologies continue to advance at a rapid pace. Indeed, computer technologies are involved in many aspects of a person's day. For example, many electronic devices being used today have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Electronic devices and computers typically have one or more processors at the heart of the device or computer. The processor(s) usually are interconnected to different external inputs and outputs and function to manage the particular computer or device. For example, a processor in a facsimile machine may be in electronic communication with buttons on the machine and with the scanning and printing components to enable faxes to be sent and received. By way of further example, a thermostat may be connected to buttons used to select the temperature setting, to the furnace or air conditioner to change the temperature, and to temperature sensors to read and display the current temperature on a display.

Many electronic devices include one or more small computers. For example, copiers, printers, facsimile machines, multi-function peripherals, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor, but they often have input and output devices such as keypads, buttons and smaller displays (such as an LCD). Usually, at the heart of each embedded system is one or more processor(s).

Embedded systems include and utilize non-volatile memory and volatile memory. Non-volatile memory is memory that holds its content without power. Examples of non-volatile memory are ROMs, PROMs, EPROMs, flash memory, hard drives, etc. Volatile memory loses its content without power. An example of volatile memory is RAM.

Typically at startup, embedded systems copy items from non-volatile memory to volatile memory or to RAM. Data stored in RAM may be accessed faster and thus improves performance of the embedded system. As a result, it is desirable to use RAM when possible. In certain cases RAM is not available for use because it is occupied by other program code or data. It would be beneficial to use RAM for its most efficient use and/or to reduce the RAM usage requirements of an embedded system. In addition, it would be beneficial to allow the RAM usage to be configurable.

SUMMARY OF THE INVENTION

An embedded system configured to reduce volatile memory usage by loading individual software components is disclosed. The embedded system includes a processor, volatile memory in electronic communication with the processor and non-volatile memory in electronic communication with the processor. The non-volatile memory includes an operating system, a loader application, a loading table and multiple individual software components. The non-volatile memory also includes loading instructions that load and start the operating system. The loading instructions also load and start the loader application. The loading table is then examined to determine which of the individual software components are to be loaded into the volatile memory. Next, each of the individual software components that are to be loaded as indicated in the loading table are loaded into the volatile memory.

Embodiments of the embedded system may include various components and may be configured in different ways. For example, the embedded system may be a multi-functional peripheral. In addition, the volatile memory may be RAM. Another example of a specific emodiment is that the individual software components may be software libraries.

The embedded system may be configured such that a user can configure the loading table. Embodiments of the embedded system may include an input component in electronic communication with the processor for a user to enter user input and thereby configure the loading table. In addition, a display may be included in electronic communication with the processor that displays information to the user relating to the loading table. A menu structure may be used that may be navigated by a user using the input component and the display to configure the loading table. The user may configure the loading table directly or indirectly.

The loading table may be a license table including a list of licenses relating to the individual software components. In this embodiment, the individual software components with licenses, as indicated by the license table, are loaded into the volatile memory.

In certain embodiments a user may configure the loading table through use of a web browser. To enable configuration by a web browser, the embedded system may include a communications module in electronic communication with the processor for communications with a computer and a web interface that may be accessed by a user through use of a web browser to configure the loading table. The web interface may include a web page.

The loading table may be modified based on a hardware configuration examination. The loader application may examine the hardware configuration of the embedded system and may then modify the loading table based on the hardware configuration examination.

A computer-readable medium may be used to carry program data. The program data may include executable instructions for implementing a method for reducing volatile memory usage by loading individual software components. The medium includes loading instructions that load and start the operating system. The loading instructions also load and start the loader application. The loading table is then examined to determine which of the individual software components are to be loaded into the volatile memory. Next, each of the individual software components that are to be loaded as indicated in the loading table are loaded into the volatile memory.

A method is also disclosed for reducing volatile memory usage in an embedded system by loading individual software components. In the method an operating system is loaded into volatile memory and then started. A loader application is also loaded into volatile memory and then started. The loading table is examined to determine which individual software components are to be loaded into the volatile memory and these individual software components are loaded into the volatile memory.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
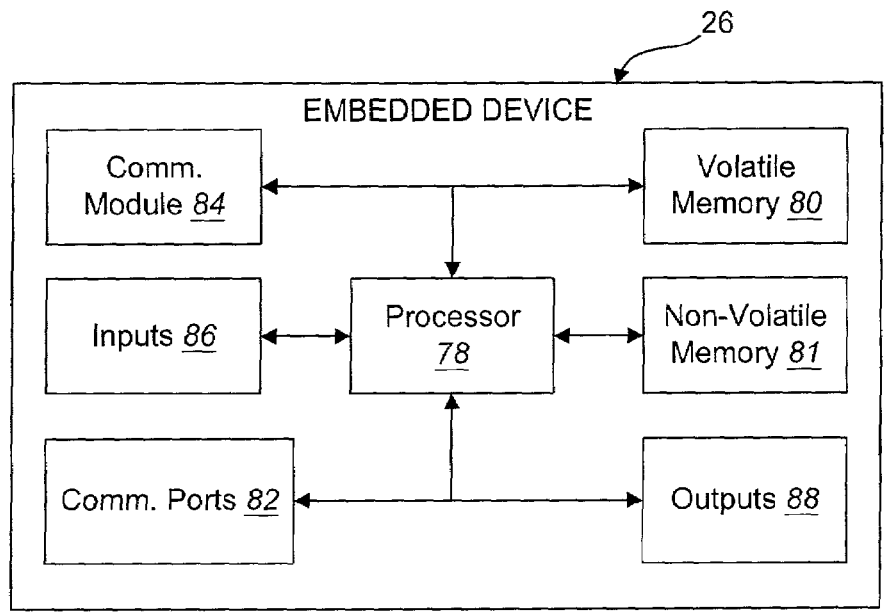
FIG. 1 is block diagram illustrating hardware components typically used in an embodiment of an embedded device.

FIG. 1 illustrates typical hardware components of an embodiment of an embedded system 26 configured to reduce volatile memory 80 usage by loading individual software components. The embedded system 26 is typically a multi-functional peripheral, such as a combination printer/fax/copier. However, the embedded system 26 may more generally be any electronic device 26 that may be configured as disclosed herein.

An embodiment of an embedded device 26 includes a processor 78 and memory 80, 81. The embedded device 26 includes both volatile memory 80 (e.g., RAM) and non-volatile memory 81 (e.g., ROM, flash, a hard drive). Those skilled in the art will appreciate the various types of processors 78 and memory 80, 81 that can be used. For example, an embodiment of an embedded device 26 may include a single-board computer that includes the processor 78 and memory 80, 81.

Such single-board computers are commercially available. Alternatively, the embedded device 26 may include a microcontroller as the processor 78.

The embedded device 26 may also include communications ports 82. The communications ports 82 enable communication with computers, computer networks and/or other electronic devices. Those skilled in the art will appreciate the various types of communication ports 82 that can be used with the embodiments herein.

A communications module 84 is included in the embedded device 26 for communications with a computer (not shown) through a computer network (not shown). Communication modules 84 that are capable of sending and receiving communications with a computer, with a LAN, a WAN, etc., are commercially available.

The embodiment of FIG. 1 also includes inputs 86 that allow a user to enter user input to the embedded device 26. The inputs 86 may be a set of buttons, switches, sensors, etc. In addition, the inputs 86 may be a keypad or buttons used in combination with a user interface to implement a menu structure or graphical user interface. Those skilled in the art will appreciate the various kinds of inputs 86 that can be used for a user to enter user input. Other examples of possible inputs 86 include a touch screen, a keyboard, a mouse, a joystick, etc.

An embodiment of an embedded device 26 may also include outputs 88 to present information to the user. For example, messages or information may be displayed to the user on an output device 88, such as a display (not shown). A typical display that may be used is an LCD. Other output devices may also be used. For example, a printer (not shown) may also be used to print information for the user. In addition, an audio device (not shown) may be used present information to a user.

Figure 2:
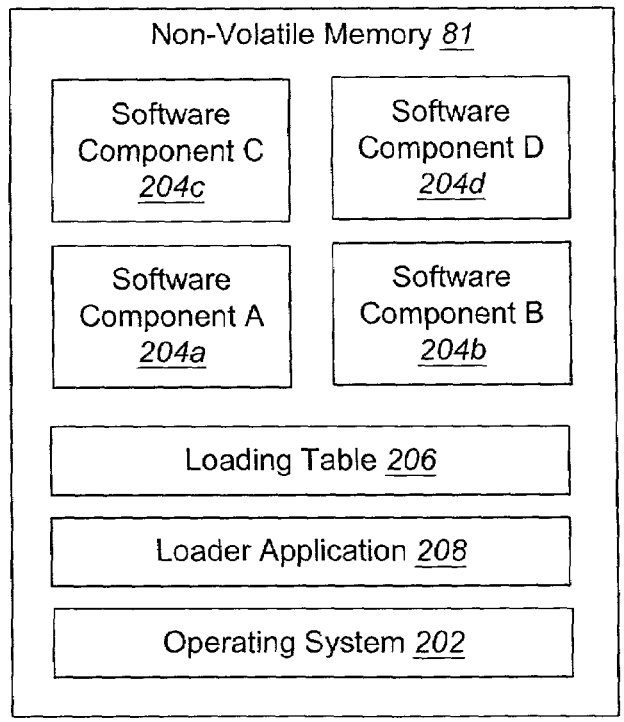
FIG. 2 is a block diagram of an embodiment of non-volatile memory.

Referring now to FIG. 2, an embodiment of the non-volatile memory 81 may store several software components 204 to execute on the embedded device 26. An operating system 202 may be stored for the embedded device 26. In addition, multiple software components 204 may be stored for operation of multiple features or components. Typically, the software components 204 are software libraries that include the functionality necessary for operation of one or more features or components. As a result, if certain features or components are not needed or will not be used, they do not have to be loaded into volatile memory 80 thus leaving more memory for other program code that is needed.

In the embodiments herein, the program code is designed and implemented such that one or more software components 204 are available. Depending on how much control is desired over what is loaded into memory 80, one skilled in the art may design a system with very few components 204 or with very many components 204.

A loading table 206 may be used to configure which software components 204 are to be loaded into volatile memory 80 and which are not. The loading table 206 may be a data structure capable of storing information. The loading table 206 may be implemented in various ways, as will be appreciated by those skilled in the art. For example, the table 206 may simply be a byte or series of bytes, the table 206 may be a file, the table 206 may be a file formatted as a table structure, etc.

A loader application 208 is also stored in the non-volatile memory 81 and is programmed to examine the loading table 206 and load the software components 204 into volatile memory 80 as specified by the loading table 206. Initially the embedded device 26 loads the operating system 202 into volatile memory 80. Then the device 26 loads the loader application 208 to selectively load the appropriate software components 204.

In the embodiments herein, the loader application 208 also includes the core of the program code needed to run the system 26. Thus, program code that is always required for the embedded system 26 may be included as part of the loader application 208. Alternatively, core program code (code that should always be loaded into memory 80) may be placed in a separate software component and the loader application 208 may be configured to automatically load any program core software components.

There are many tools that are currently available that may be used to provide separate software components 204 that can be loaded individually. For example, in one embodiment the Shared Library Manager available in the pSOSystem real-time operating system from Wind River Systems, Inc. may be used.

Figure 3:
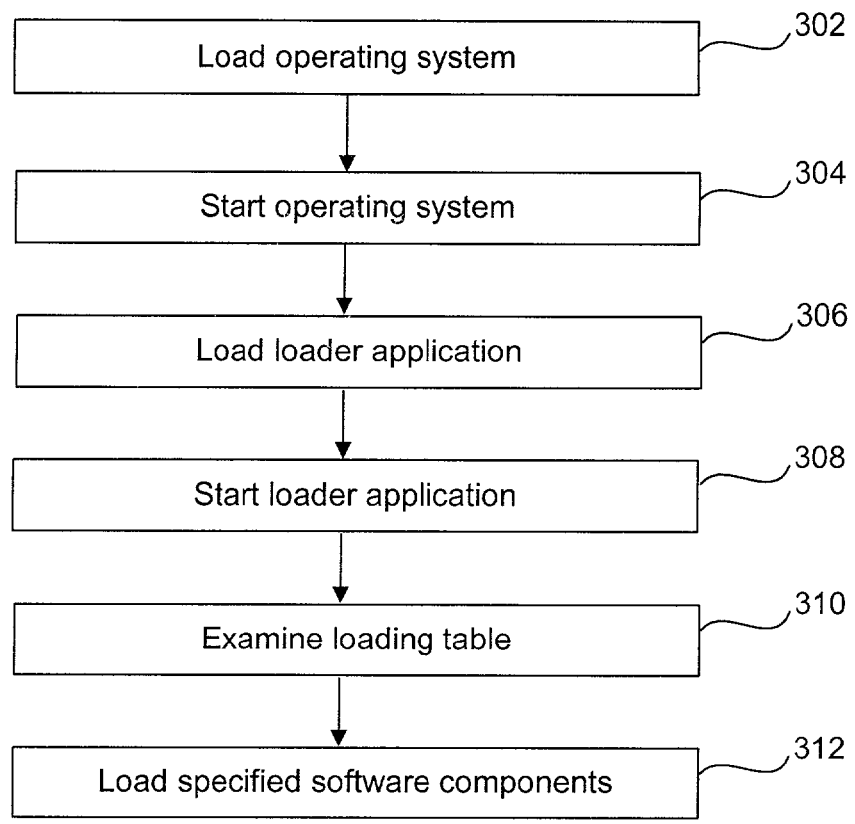
FIG. 3 is a flow diagram illustrating an embodiment of a method of operation for the embedded device.

FIG. 3 is a flow diagram illustrating operation of an embodiment of the embedded device 26. As is known by those skilled in the art, embedded devices 26 are programmed or configured with booting instructions (not shown), typically in ROM, that boot up the embedded device 26 so that it has its' first instructions to begin executing. The embedded device 26 then loads 302 the operating system 202. The operating system 202 may then be started 304. Then the loader or loading application 208 is loaded 306 into volatile memory 80 and then started 308. The loader application 208 then examines 310 the loading table 206 to determine which of the individual software components 204 are to be loaded into the volatile memory 80. As indicated in the loading table 206, certain of the individual software components 204 are then loaded 312 into the volatile memory 80.

Figure 4:
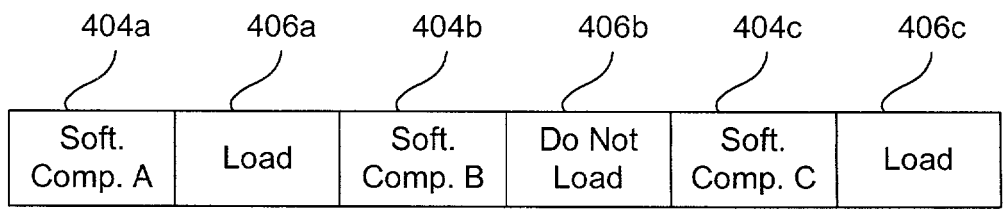
FIG. 4 is a data structure diagram of an embodiment of a loading table.
Figure 4:

FIG. 4 illustrates an embodiment of a data structure that may be used as a loading table 402. The loading table 402 may include a component identifier 404 followed by a loading identifier 406. Several pairs of component and loading identifiers 404, 406 may be included in the loading table 402. As shown in the example of FIG. 4, the first component identifier 404*a* indicates software component A and the following loading identifier 406*a* comprises a load indicator to indicate that software component A is to be loaded into volatile memory 80. The second component identifier 404*b* indicates software component B and its' following loading identifier 406*b* comprises a do-not-load indicator to indicate that software component B is not to be loaded into volatile memory 80. The loading table 402 also indicates that software component C is to be loaded into volatile memory 80.

Figure 5:
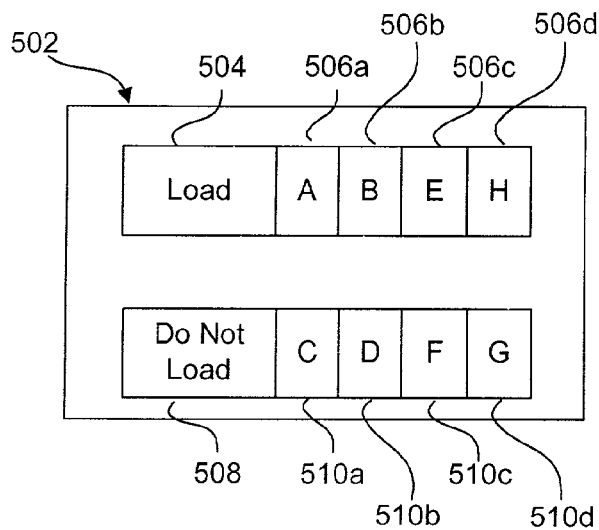
FIG. 5 is a data structure diagram of another embodiment of a loading table.

Referring now to FIG. 5, another embodiment of a data structure that may be used as a loading table 502 is illustrated. The loading table 502 may include one loading identifier 504 followed by a list of component identifiers 506 to indicate that the software components identified after the loading identifier 504 are to be loaded into volatile memory 80. As shown in the example of FIG. 5, software components A, B, E and H are to be loaded into volatile memory 80. The loading table 502 also includes a non-loading identifier 508 followed by a list of component identifiers 510 to indicate that the software components identified after the non-loading identifier 508 are not to be loaded into volatile memory 80. As shown in the example of FIG. 5, software components C, D, F and G are not to be loaded into volatile memory 80.

The loading table 206 may also be stored in table form, as will be illustrated below in Table 1. Table 1 illustrates a loading table 26 where the software components 204 and an indication as to whether each component should be loaded into volatile memory are stored in table form.

TABLE 1

| Load Status | Software Component |
|---|---|
| Do Not Load | Component A |
| Load | Component B |
| Do Not Load | Component C |
| Do Not Load | Component D |
| Load | Component E |
| Load | Component F |
| Load | Component G |
| Do Not Load | Component H |
| Load | Component I |
| Load | Component J |

The loading table 206 may be configured by the user through user input. In addition, the loading table 206 may be configured based on licenses for each software component. If the loading table 206 is based on software licenses, the loading table 206 may simply be a table of licenses, as shown below in Table 2. Sometimes an embedded system 26 may have several components 204 that do not execute because the necessary hardware and/or license keys are not installed on the device 26. Typically the embedded system 26 will load all the components 24 into volatile memory 80 even though portions of the code will never be used because the necessary hardware and/or license keys are not available. Through use of the embodiments herein and a loading table 206, the components 204 that will never be used are not loaded into volatile memory and thus do not consume valuable volatile memory 80 resources.

TABLE 2

| License Status | Software Component |
|---|---|
| License (Load) | Component A |
| No License (Do Not Load) | Component B |
| No License (Do Not Load) | Component C |
| No License (Do Not Load) | Component D |
| License (Load) | Component E |
| No License (Do Not Load) | Component F |
| License (Load) | Component G |
| License (Load) | Component H |
| License (Load) | Component I |
| No License (Do Not Load) | Component J |

Of course, it will be appreciated by those skilled in the art that a loading table 206 may be a combination of items that are user configured and that are license configured. In addition, the loading table 206 may comprise two sub-tables (not shown) where one table is for license-related loading and the other is for non-license-related loading.

The loading table 206 may be configured by the user. Using the inputs 86 and the outputs 88, a user may configure what components 204 are to be loaded into volatile memory 80. Those skilled in the art will appreciate various ways this may be accomplished. For example, a menu structure may be provided that the user may navigate to enable and/or disable certain features of the device 26. When a feature is disabled by the user, program code may write to the loading table 206 to indicate that the software component(s) 204 associated with the feature are not to be loaded the next time the embedded device 26 loads items into volatile memory 80.

In another embodiment of the loading table 26, the loading table 206 may be in the form of a web page (not shown) that may be access via a computer (not shown). The computer may be in communication with the embedded device 26 and use a web browser to access the web page loading table 206 and modify the loading table 206 as desired. The web page (not shown) may act as a web interface whereby a person using a web browser may access the loading table 206 and make desired changes.

The loading table 206 may be modified directly by a user or it may be modified indirectly. In certain embodiments of the embedded device 26, the user may be able to enter inputs that immediately make changes to the loading table 206. However, in other embodiments, the user inputs may be stored or processed separate from the loading table 206 and may cause the loading table 206 to be indirectly changed.

Hardware configuration may be examined to determine which software components 204 are to be loaded. In one embodiment, a user may use switches or buttons on the device 26 to indicate which features or components are needed. The device 26 may then examine the state of the switches to create the loading table 208. Typically the switches will be labeled with the feature name as well as with the "on" and "off" positions such that it will be clear to a user how the switch configures the device 26. In another embodiment, the device 26 may examine itself to determine if certain hardware components are present, and, if certain hardware components are not present, the device 26 may modify the loading table 206 such that the software components 204 corresponding to the missing hardware components are not loaded.

Figure 6:
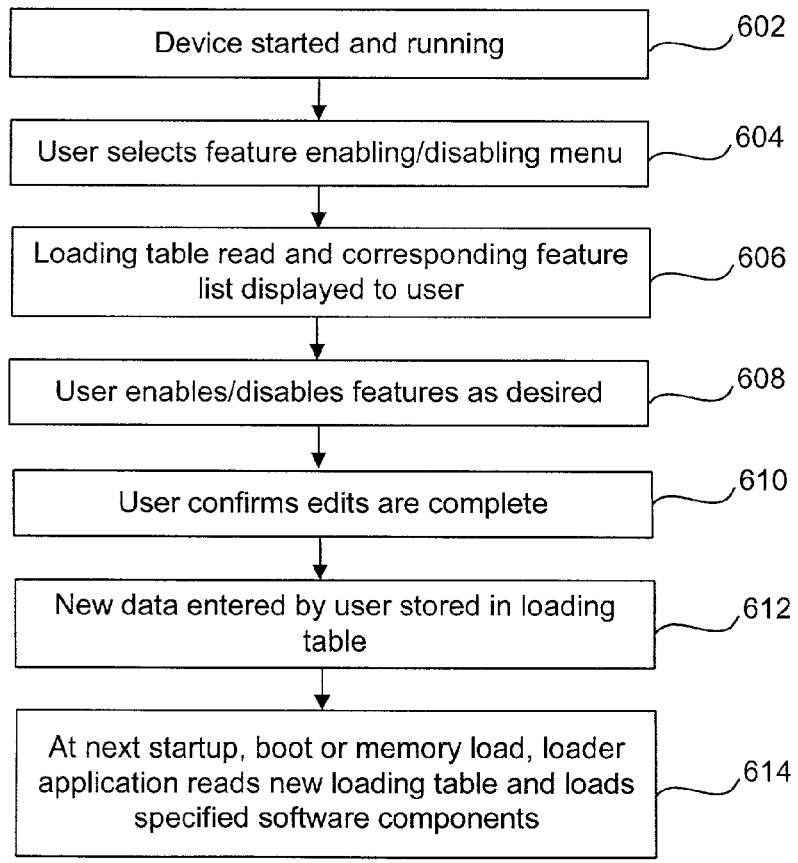
FIG. 6 is a flow diagram illustrating an embodiment of a method for user configuration of the loading table.

Referring now to FIG. 6, a flow diagram illustrating an embodiment of a method for user configuration of the loading table 206 is shown. The embedded system 26 or device is first started 602 so that it enters an operational state. Using inputs 86 on the system 26, the user may select 604 a feature enabling/disabling menu. As is known in the art, the combination of the inputs 86 and outputs 88 may be used together to enable a user to navigate through and use a menu structured user interface. The loading table 206 is then read 606 and a corresponding feature list is displayed to the user. The user may then enable or disable 608 features as desired. Before the system 26 exits from the editing state, typically a user is prompted to confirm 610 that the edits are complete. Then new data entered by the user is stored 612 in the loading table 206. That is, changes made by the user are saved in the loading table 206 so that they are available the next time the loading table 206 is examined. At the next startup, boot or memory load procedure, the loader application 208 reads 614 the loading table 206 and loads the specified software components 204. As illustrated, embodiments herein allow a user to configure what components are loaded into volatile memory.

Figure 7:
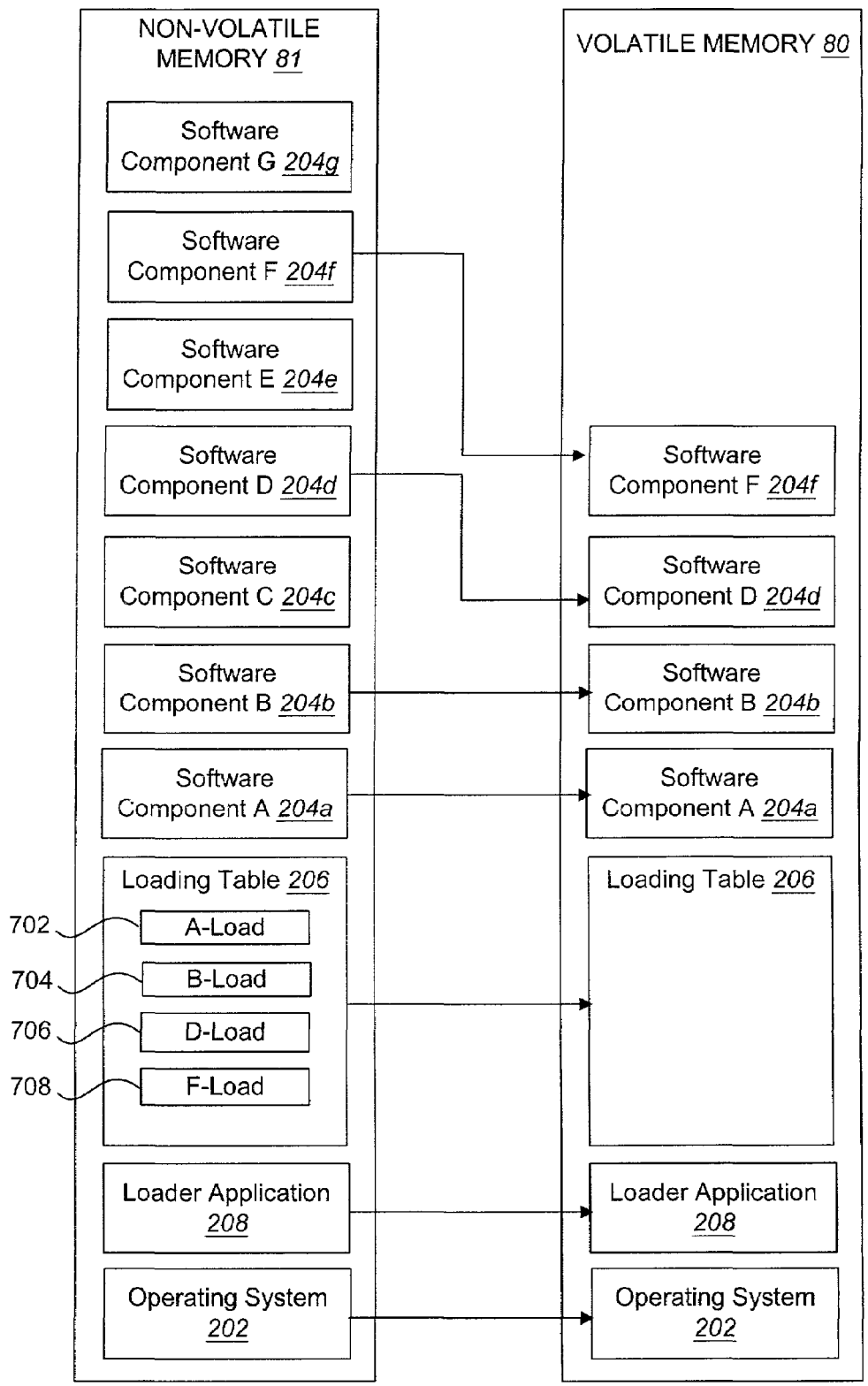
FIG. 7 is a memory diagram illustrating components loaded into volatile memory from non-volatile memory.

FIG. 7 is a memory diagram illustrating the components loaded into volatile memory 80 from non-volatile memory 81. As discussed in relation to FIG. 2, the non-volatile memory 81 may store the operating system 202, the loader application 208, the loading table 206 and various individual software components 204. As shown, the loading table 206 includes load indicators 702-708 indicating which software components 204 are to be loaded.

When the embedded system 26 first boots up or is reset in some way, the operating system 202 is first loaded into volatile memory 80. Then the loader application 208 is loaded into volatile memory 80. The loading table 206 may also be loaded into volatile memory 80, or it may be used from a location in non-volatile memory 81. In the example illustrated in FIG. 7, the loader application 208 examines the loading table 206 and determines that it is to load components A 204a, B 204b, D 204d and F 204f. The loader application 208 then loads these specific software components 204, leaving the other components 204 only in non-volatile memory 81.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for reducing volatile memory usage in a multi-functional peripheral comprising a printer by loading some individual software components and not loading other individual software components, the method comprising:

examining a loading table to determine which of a plurality of individual software components are to be loaded into volatile memory, wherein the software components comprise software libraries, wherein the individual software components that are loaded into the volatile memory correspond to a configuration of the multi-function peripheral, and wherein the individual software components that are not loaded into the volatile memory do not correspond to the configuration of the multi-functional peripheral;

loading each of the plurality of individual software components that are to be loaded, as indicated in the loading table, into the volatile memory so that these software components are all loaded into the volatile memory at the same time; and not loading any of the plurality of individual software components that are not to be loaded into the volatile memory as indicated in the loading table.

2. The method as defined in claim 1, wherein the multi-functional peripheral comprising a printer is a printer/fax/copier.

3. The method as defined in claim 1, further comprising providing a user interface to the user for configuring the loading table.

4. The method as defined in claim 3, wherein the user interface includes a menu structure that may be navigated by the user to configure the loading table.

5. The method as defined in claim 1, wherein the loading table is a license table comprising a list of licenses relating to the individual software components.

6. The method as defined in claim 5, wherein the individual software components with licenses, as indicated by the license table, are loaded into the volatile memory.

7. The method as defined in claim 1, further comprising providing a web interface accessible by a user through use of a web browser to configure the loading table.

8. The method as defined in claim 1, further comprising:
examining a hardware configuration by the loader application; and
modifying the loading table based on the hardware configuration.

9. A multi-functional peripheral device comprising a printer configured to reduce volatile memory usage by selectively loading some individual software components and not loading other individual software components, the multi-functional peripheral device comprising:

a processor;

volatile memory in electronic communication with the processor;

non-volatile memory in electronic communication with the processor comprising:

a plurality of individual software components, wherein the software components comprise software libraries; and a loading table that indicates which of the plurality of individual software components are loaded into the volatile memory and which of the plurality of individual software components are not loaded into the volatile memory, wherein the individual software components that are loaded into the volatile memory correspond to a configuration of the multi-function peripheral device, and wherein the individual software components that are not loaded into the volatile memory do not correspond to the configuration of the multi-functional peripheral device;

instructions stored in the non-volatile memory that are executable to:

examine the loading table to determine which of the plurality of individual software components are to be loaded into the volatile memory; and load each of the plurality of individual software components that are to be loaded, as indicated in the loading table, into the volatile memory so that these software components are all loaded into the volatile memory at the same time; and not load any of the plurality of individual software components that are not to be loaded into the volatile memory as indicated in the loading table.

10. The multi-functional peripheral device comprising a printer as defined in claim 9, wherein the multi-functional peripheral is a printer/fax/copier.

11. The multi-functional peripheral device comprising a printer as defined in claim 9, further comprising an input component in electronic communication with the processor for a user to enter user input and thereby configure the loading table.

12. The multi-functional peripheral device comprising a printer as defined in claim 11, further comprising a display in electronic communication with the processor that displays information to the user relating to the loading table.

13. The multi-functional peripheral device comprising a printer as defined in claim 12, further configured with a menu structure that may be navigated by a user using the input component and the display to configure the loading table.

14. The multi-functional peripheral device comprising a printer as defined in claim 9, wherein the loading table is a license table comprising a list of licenses relating to the individual software components.

15. The multi-functional peripheral device comprising a printer as defined in claim 14, wherein the individual software components with licenses, as indicated by the license table, are loaded into the volatile memory.

16. The multi-functional peripheral device comprising a printer as defined in claim 9, further comprising:

a communications module in electronic communication with the processor for communications with a computer; and a web interface accessible by a user through use of a web browser to configure the loading table.

17. The multi-functional peripheral device comprising a printer as defined in claim 9, wherein the instructions are further executable to:

examine a hardware configuration by a loader application; and modify the loading table based on the hardware configuration.

18. A computer-readable medium storing instructions configured to reduce volatile memory usage in a multi-function peripheral comprising a printer by loading some individual software components and not loading other individual software components, the instructions being executable to:

examine a loading table to determine which of a plurality of individual software components are to be loaded into volatile memory, wherein the software components comprise software libraries, wherein the individual software components that are loaded into the volatile memory correspond to a configuration of the multi-function peripheral, and wherein the individual software components that are not loaded into the volatile memory do not correspond to the configuration of the multi-functional peripheral;

load each of the plurality of individual software components that are to be loaded, as indicated in the loading table, into the volatile memory so that these software components are all loaded into the volatile memory at the same time; and not load any of the plurality of individual software components that are not to be loaded into the volatile memory as indicated in the loading table.

19. The computer-readable medium as defined in claim 18, wherein the multi-functional peripheral comprising a printer is a printer/fax/copier.

20. The computer-readable medium as defined in claim 18, further comprising a user configuring the loading table.

21. The computer-readable medium as defined in claim 20, wherein the instructions are further executable to provide a user interface to the user for configuring the loading table.

22. The computer-readable medium as defined in claim 21, wherein the user interface includes a menu structure that may be navigated by the user to configure the loading table.

23. The computer-readable medium as defined in claim 18, wherein the loading table is a license table comprising a list of licenses relating to the individual software components.

24. The computer-readable medium as defined in claim 23, wherein the individual software components with licenses, as indicated by the license table, are loaded into the volatile memory.

25. The computer-readable medium as defined in claim 18, wherein the instructions are further executable to provide a web interface accessible by a user through use of a web browser to configure the loading table.

26. The computer-readable medium as defined in claim 18, wherein the instructions are further executable to:

examine a hardware configuration by a loader application; and modify the loading table based on the hardware configuration.

* * * * *